Dec. 30, 1941.  E. P. RENAUX ET AL  2,267,874
DEVICE FOR THE MOUNTING OF ENGINES OR LIKE APPARATUS
Filed Jan. 3, 1939  3 Sheets-Sheet 1
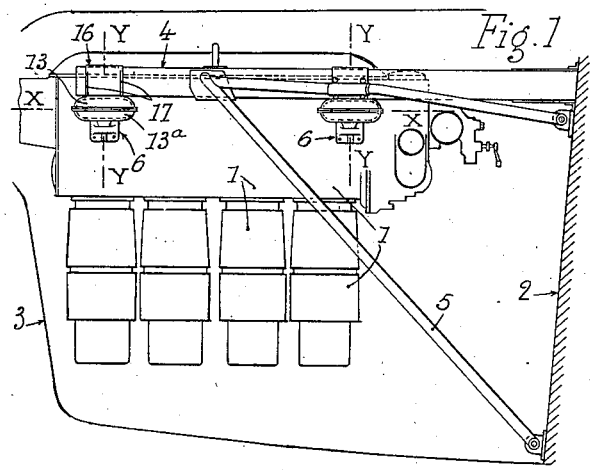
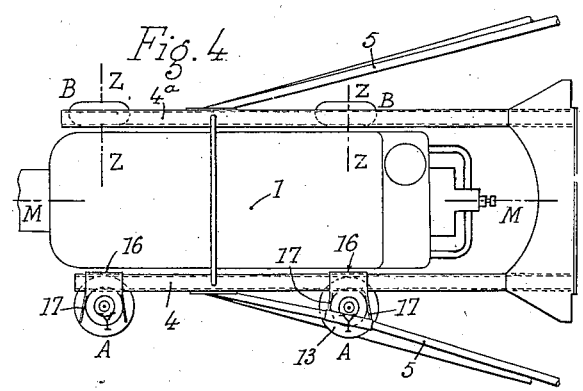
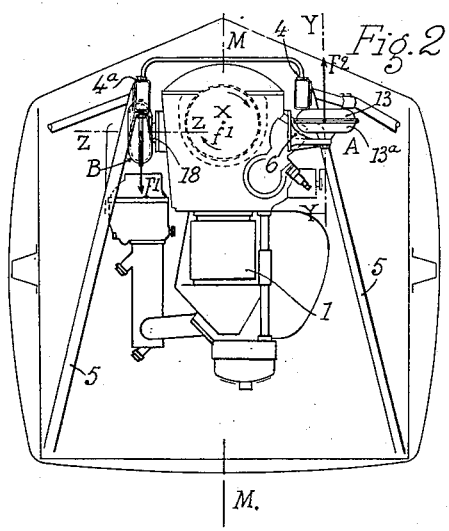
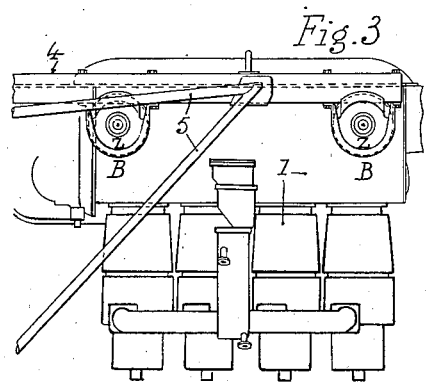
E. P. Renaux
+ L. J. Renaux
Inventors
By Glascock Downing & Seebold
Attys.

Dec. 30, 1941.   E. P. RENAUX ET AL   2,267,874
DEVICE FOR THE MOUNTING OF ENGINES OR LIKE APPARATUS
Filed Jan. 3, 1939   3 Sheets-Sheet 2
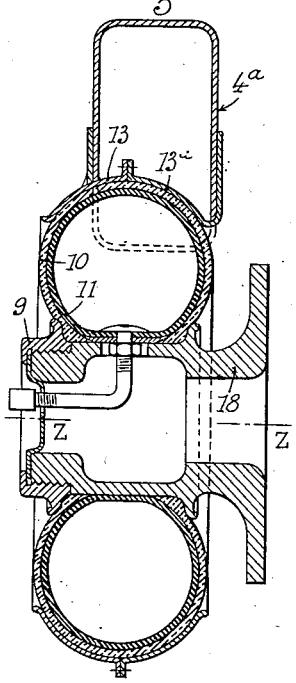
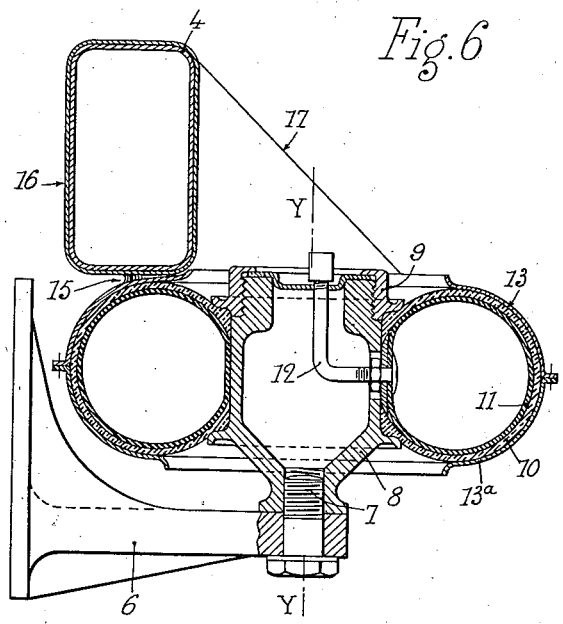
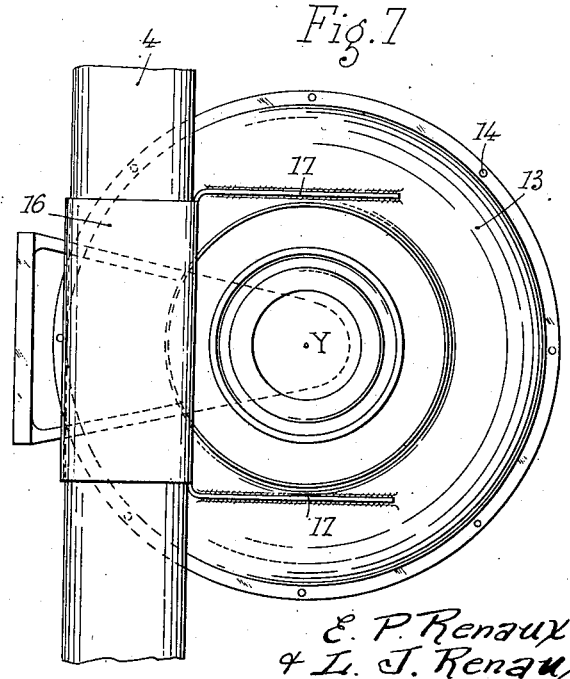
E. P. Renaux
& L. J. Renaux
Inventors Dec. 30, 1941.    E. P. RENAUX ET AL    2,267,874
DEVICE FOR THE MOUNTING OF ENGINES OR LIKE APPARATUS
Filed Jan. 3, 1939    3 Sheets-Sheet 3
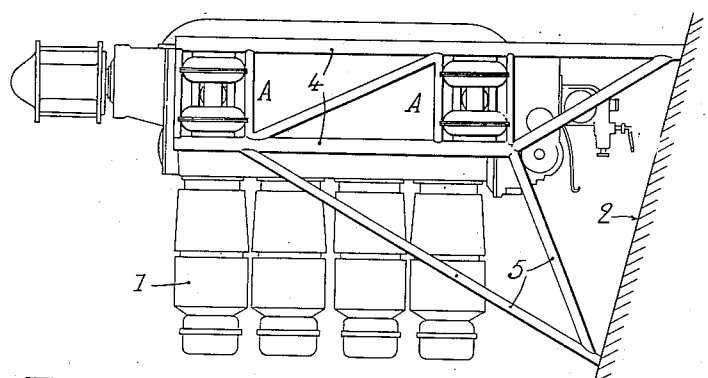
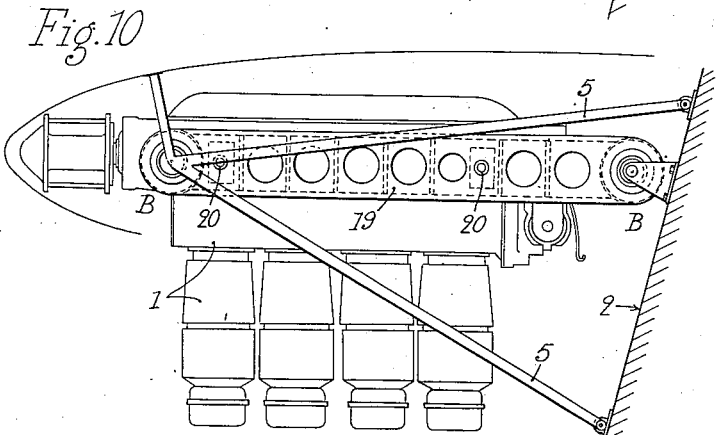
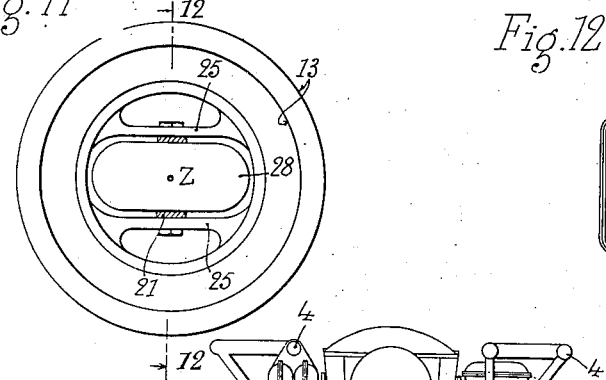
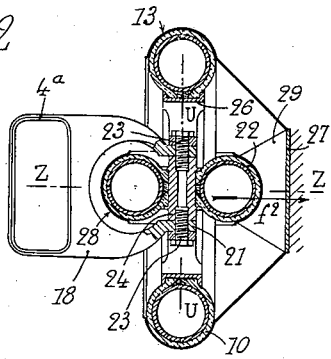
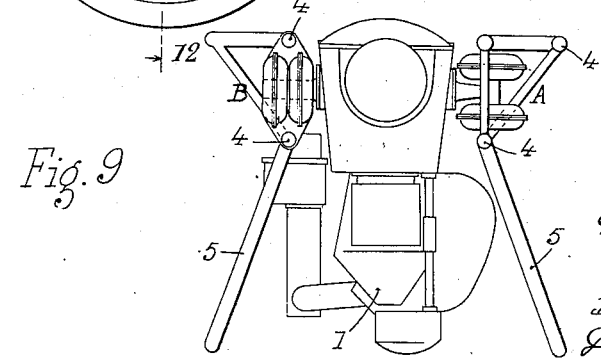
E. P. Renaux
& L. J. Renaux
Inventors
By: Glascock
Downing & Seebold
Attys.

Patented Dec. 30, 1941

2,267,874

UNITED STATES PATENT OFFICE 2,267,874

DEVICE FOR THE MOUNTING OF ENGINES OR LIKE APPARATUS

Eugène Prosper Renaux, Paris, and Lucien Jules Renaux, Livry-Gargan, France

Application January 3, 1939, Serial No. 249,122
In France January 7, 1938

1 Claim. (Cl. 248—5)

Improved devices are already known for the securing of an engine to its support, which may consist of a frame, such as a testing bench, or of a vehicle frame, of a land or water type; or for the securing of an engine group for propulsion or traction to the framework of an aeroplane; or in a more general manner, for the securing of any suitable apparatus comprising one or more parts having a movement of rotation or oscillation, to any suitable support or frame.

The said devices comprise a certain number of rings or other elements of revolution, which may be subject to elastic deformation according to their axis of revolution, but which withstand radial deformations. The said rings consist for example of pneumatic devices operating at atmospheric pressure or adjustable pressure, and they are mounted in such manner that the effect of the reaction torque due to the parts in rotation or oscillation will be exerted upon each of the said rings or like devices according to its axis or in a direction which is very near this axis, while all the other vibrations will be strongly counteracted, as they are exerted upon the ring in radial or practically radial directions.

The present invention relates to a device of this construction, which is chiefly adapted for use with engines having cylinders in alignment, and is principally distinguished by the fact that there are disposed on one side of the engine (or like apparatus) one or more connecting rings or analogous devices which may be subject to elastic deformation and have vertical axes of revolution, while on the other side there are disposed one or more like devices whose axes of revolution are horizontal and are perpendicular to the vertical longitudinal plane of the engine.

The rings having horizontal transverse axes will resist the vibrations occurring in a plane parallel to the vertical longitudinal middle plane; the rings having vertical axes will resist the horizontal vibrations. The variations of the reaction torque and the corresponding oscillations are counterbalanced in an elastic manner with a great latitude of oscillation of the engine, as the rings with vertical axis are readily deformable on this axis, while the rings with horizontal axis form a hinge by the oscillation of their central part about a horizontal diameter.

The rings with vertical axis are preferably situated on the side at which the reaction torque is upwardly directed, i. e., contrary to the action of gravity. Thus the mean stresses brought upon the said rings are greatly reduced.

The invention further relates to apparatus consisting of an engine or like device which is connected by a suspension of the aforesaid type with a frame or like support.

In the accompanying drawings, which are given solely by way of example:

Fig. 1 is a general view of an engine with its securing device, on the side at which the connecting rings have vertical axes.

Fig. 2 is a corresponding end view.

Fig. 3 is a partial view on the side at which the connecting rings have horizontal and transverse axes.

Fig. 4 is a corresponding plan view.

Fig. 5 is a vertical section of one of the connecting devices with horizontal transverse axis.

Fig. 6 is a like view of one of the connecting devices with vertical axis.

Fig. 7 is a corresponding plan view.

Figs. 8 and 9 are views, resembling Figs. 1 and 2, of a modification in which the rings are mounted in pairs.

Fig. 10 is an elevational view of another modification.

Fig. 11 is a front view of a modified connecting device which comprises, in combination, two rings whose axes are perpendicular to each other, and which are mounted one within the other.

Fig. 12 is a section on the line 12—12 of Fig. 11.

In the embodiment shown in Figs. 1 to 4, the engine 1, whose cylinders are in alignment and in which the longitudinal axis of the crank-shaft is located at XX, is secured in an elastic manner, at the end of the main frame 2 and in the interior of a hood 3, to two longitudinal beams 4 and 4ª which are secured to the frame 2 and are reinforced by struts 5.

The crank-shaft being supposed to rotate in the direction of the arrow $f^1$ (Fig. 2) so that the resistance torque will be exerted in the contrary direction to this arrow, on the side at which the torque acts against the force of gravity (on the right hand side in Fig. 2), the engine 1 is connected with the beams 4 and 4ª or the struts 5 by two or more elastic rings A having vertical axes YY.

At the other end, the engine is connected with the said beams or struts by two or more devices B which comprise elastic rings having horizontal and transverse axes ZZ, which are thus perpendicular to the vertical longitudinal middle plane MM (Figs. 2 and 4).

Each device A having a vertical axis YY comprises for instance a fitting 6 (Figs. 6 and 7) which is secured to the engine by bolts, by welding, or otherwise. The said fitting 6 is secured by a screw 7 or by other means to a member 8 having a form of revolution about the vertical axis YY. The periphery of said member 8 forms a rim in combination with an auxiliary member 9 which is secured to the same by screwing or otherwise. Upon the said rim so constituted is mounted a pneumatic device 10, provided with an inner air tube 11 and a valve 12. It should be noted that the inner air tube can be eliminated, if the pneumatic device operates at atmosphere pressure. At its periphery, the said pneumatic device is clamped between two half shells 13 and 13ª which are connected together by bolts 14 or otherwise. One of the said shells is secured by welding or by like means, at 15, to a sleeve 16 surrounding the beam 4 of the support. The said sleeve 16 preferably comprises two stiffening flanges 17 which are welded to the half shell 13.

Each device B having a horizontal transverse axis ZZ has a similar construction (Fig. 5). The central member 18 is secured directly to the engine while the outer shells 13 and 13ª are secured by welding or otherwise to the beam 4ª, which may be cut out if necessary.

As will be readily understood, the devices A whose axes are vertical, will counteract the horizontal oscillations of the engine, whether longitudinal, transversal or oblique. On the other hand, the devices B whose axes ZZ are horizontal and transversal, will counteract the radial oscillations whether vertical, horizontal or oblique which are situated in a vertical plane parallel to the middle plane MM, while they will show less opposition to the horizontal and transversal oscillations which are parallel to the axes ZZ. Moreover, by reason of the combination of the two sets of devices A and B, all oscillations of translation will be strongly checked in an elastic manner. On the other hand, as concerns the resistance torque, this may be subdivided, for each set of two devices A and B, into two vertical forces $F^1$ and $F^2$ (Fig. 2) of equal value but in opposite directions, which are applied to said devices together with two vertical downwardly directed components of the weight. The variations of the force $F^1$ are damped, without any great movement, by the device B, while on the contrary, the device A allows variations of the force $F^2$. It should be noted that this device is not obliged to withstand any great stresses, as the force $F^2$ and the downwardly directed component of the weight will be partially balanced. Moreover, by the effect of the variations of the resistance torque, the whole device will turn about a horizontal axis which practically coincides with the horizontal diameters of the devices B whose rims turn about the said axis outside of their middle plane. The devices B will thus act, so to speak, as hinges.

It is evident that such oscillations of the whole apparatus will be braked in an elastic manner, and this braking will increase with their amplitude, and the braking can be controlled according to the pressure employed in the pneumatic devices 10.

Figs. 8 and 9 show a modification in which each device A or B comprises two associated pneumatic devices.

In the apparatus shown in Fig. 10, the devices B having horizontal and transverse axes, instead of being secured directly to the engine, are secured to a longitudinal beam 19 which is secured in a rigid or elastic manner to the engine at 20. By this means, one of the devices can be brought far to the rear and can be secured directly to the frame 2.

Figs. 11 and 12 show a modification of the device having a horizontal axis ZZ. In this modification, the fitting 18 has the form of a forked bracket 21 containing a pneumatic device 22 having a vertical axis UU situated in the middle plane of the pneumatic device 10. The said bracket 21 is secured by screws 23 or otherwise to a shaft 24 forming the rim of the pneumatic device 22, and also to two arms 25 secured to the rim 26 of the vertical pneumatic device 10. The said pneumatic device 10 is mounted in the shell 13 which is connected with a fitting 27, and the horizontal pneumatic device 22 is mounted in another shell 28 which is secured to the said fitting 27 by a bracket 29. As will be noted, the horizontal auxiliary pneumatic device 22 forms an elastic stop in the direction of the arrow $f^2$, thus bearing against the members 29 and 27.

Obviously, the invention is not limited to the embodiments herein described and represented, which are given solely by way of example. The positions of the various devices A and/or B along the engine or other apparatus may vary according to the space which is available. One or more of these may if necessary be brought to the front and/or the rear, adjacent the least cumbersome parts of the engine, etc. The arrangements with horizontal axes or vertical axes may, if required, be combined with devices having oblique axes. The pneumatic devices may be replaced by any other elastic rings, whether solid or hollow, which are adapted for the same use, such as a plate of rubber or like material which is limited by two hyperboloids or analogous surfaces in opposite position by their large bases.

In the embodiments herein represented, the internal rims of the pneumatic devices are secured to the engine or like apparatus, either directly or indirectly and the outer shells are secured to the main frame or like support, but it is evident that the contrary arrangement may be adopted.

Having now described our invention what we claim as new and desire to secure by Letters Patent is:

An arrangement for securing on a support apparatus provided with parts rotating or oscillating about an axle comprising, at least one deformable ring of elastic material disposed with the axis thereof in a vertical direction and arranged at one side of said axle, at least one other deformable ring of elastic material disposed with the axis thereof in a horizontal direction at substantially right angles to a vertical plane passing through said axle and arranged on the other side of said axle, each deformable ring having an outer rim along the outer periphery thereof and an inner rim along the central opening of the deformable ring, said rims being respectively secured to said apparatus and to said support, elastic stop means adapted to limit relative displacements between the inner rim and the outer rim having a horizontal axis and consisting of an auxiliary deformable ring of elastic material disposed with the axis thereof in a vertical direction, and an outer rim along the outer periphery and an inner rim along the central opening of said auxiliary deformable ring respectively secured to the outer rim and to the inner rim of the deformable ring having a horizontal axis.

EUGÈNE PROSPER RENAUX.
LUCIEN JULES RENAUX.